United States Patent
Gonzalez et al.

(10) Patent No.: US 11,906,570 B2
(45) Date of Patent: Feb. 20, 2024

(54) PROCESSOR FREQUENCY IMPROVEMENT BASED ON ANTENNA OPTIMIZATION

(71) Applicant: International Business Machines Corporation, Armonk, NY (US)

(72) Inventors: Christopher Gonzalez, Shelburne, VT (US); David Wolpert, Poughkeepsie, NY (US); Michael Hemsley Wood, Wilmington, DE (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/296,519

(22) Filed: Apr. 6, 2023

(65) Prior Publication Data
US 2023/0251299 A1 Aug. 10, 2023

Related U.S. Application Data (63) Continuation of application No. 17/480,551, filed on Sep. 21, 2021, now Pat. No. 11,754,615.

(51) Int. Cl.
| | |
|---|---|
| *G01R 31/26* | (2020.01) |
| *G01R 31/28* | (2006.01) |
| *G06F 30/3312* | (2020.01) |
| *G06F 117/12* | (2020.01) |
| *G06F 119/12* | (2020.01) |

(52) U.S. Cl.
CPC ..... *G01R 31/2623* (2013.01); *G01R 31/2884* (2013.01); *G06F 30/3312* (2020.01); *G06F 2117/12* (2020.01); *G06F 2119/12* (2020.01)

(58) Field of Classification Search
CPC ............ G01R 31/2623; G01R 31/2884; G06F 30/3312; G06F 2117/12; G06F 2119/12; G06F 30/337; G06F 2119/06

USPC ............... 324/762.09, 762.01, 537, 500
See application file for complete search history.

(56) References Cited

U.S. PATENT DOCUMENTS

| | | | |
|---|---|---|---|
| 9,202,696 B2 | 12/2015 | Yang et al. | |
| 10,079,187 B2 | 9/2018 | Beckmeier et al. | |
| 10,796,050 B2* | 10/2020 | Kim | ............ G01R 31/2872 |
| 11,361,800 B2* | 6/2022 | Walter | ............. G06F 11/3013 |
| 11,562,433 B1 | 1/2023 | Gunn et al. | |
| 2019/0237459 A1 | 8/2019 | Hiura | |
| 2021/0038981 A1 | 2/2021 | Bansi et al. | |

(Continued)

FOREIGN PATENT DOCUMENTS

WO 2018070260 A1 4/2018

OTHER PUBLICATIONS

IBM: List of IBM Patents or Patent Applications Treated as Related (Appendix P); Date Filed: Apr. 6, 2023; 2 pages.

(Continued)

*Primary Examiner* — Giovanni Astacio-Oquendo
(74) *Attorney, Agent, or Firm* — Cantor Colburn LLP; Jeffrey Ingalls (57) ABSTRACT

A method is provided to increase processor frequency in an integrated circuit (IC). The method includes identifying a gate included in the IC, the gate having a gate threshold voltage and performing a plasma process to form an antenna signal path in signal communication with the gate. The method further comprises adjusting the plasma process or circuit design to increase plasma induced damage (PID) applied to the gate so as to alter the gate threshold voltage.

15 Claims, 7 Drawing Sheets

(56) References Cited

U.S. PATENT DOCUMENTS

2022/0180806 A1 6/2022 Lee et al.
2023/0086010 A1 3/2023 Gonzalez et al.
2023/0317610 A1* 10/2023 Wolpert ............... G06F 30/392
 257/773

OTHER PUBLICATIONS

Shin et al., "Thin gate oxide damage due to plasma processing," Semiconductor Science and Technology 11.4 (Apr. 1996) pp. 463-473.

* cited by examiner

PROCESSOR FREQUENCY IMPROVEMENT BASED ON ANTENNA OPTIMIZATION

BACKGROUND

The present invention generally relates to integrated circuit development, and more specifically, to integrated circuit fabrication that improves processor frequency based on antenna optimization.

Plasma processes are widely used in the manufacturing of integrated circuit (IC) devices. For instance, IC devices typically include a multitude of conductive traces that provide a signal path to one or more logic gates (e.g., a transistor). The conductive traces are typically formed using a plasma process that bombards a wafer with highly-charged ions referred to as "plasma." The plasma either deposits an electrically conductive material (e.g., by performing a plasma enhanced chemical vapor deposition (PECVD)) and/or etches away resist material to expose a conductive material. The remaining conductive material serves as the electrically conductive trace or wire.

SUMMARY

According to a non-limiting embodiment, a method is provided to increase processor frequency in an integrated circuit (IC). The method includes identifying a gate included in the IC, the gate having a gate threshold voltage and performing a plasma process to form an antenna signal path in signal communication with the gate. The method further comprises adjusting the plasma process to increase plasma induced damage (PID) applied to the gate so as to alter the gate threshold voltage.

According to a non-limiting embodiment, a system is provided to fabricate an integrated circuit (IC) having an increased processor frequency. The system includes memory and a processor. The memory is configured to store at least one timing requirement corresponding to one or both of an antenna signal path and a plasma induced damaged (PID)-altered gate formed according to a plasma process. The processor is configured to perform a timing validation run on the PID-altered gate and to determine timing results associated with the PID-altered gate in response to the timing validation run, and to detect the existence of a timing violation based on a comparison between the timing results and the timing requirement. If detected, one or both of the antenna signal path and the PID-altered gate are replaced to remove the timing violation.

A method is provided to increase processor frequency in an integrated circuit (IC). The method comprises identifying in the IC a gate and a corresponding antenna signal path, the gate having a gate threshold voltage, and performing a PID design exploitation to optimize a ratio between a metal area corresponding to the antenna signal path and a gate area corresponding to the gate. The method further comprises forming the gate and the antenna signal path on a wafer based on the optimized ratio. The optimized ratio increases a level of plasma induced damage (PID) applied to the gate so as to alter the gate threshold voltage when forming the gate and the antenna signal path.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

When performing plasma processing to form electrically conductive traces or wires, the trace or wire can behave as an antenna and collect charge. This phenomenon is referred to as an "antenna effect." Increasing the length and/or area of the trace/wire increases the amount of collected charge. The collected charge can then flow to the connected gate and alter the gate characteristics. This effect of altering the gate characteristics is sometimes referred to as "plasma induced damage" (PID).

Conventional integrated circuit (IC) fabrication strategies aim to mitigate or completely avoid exposing gates to PID. Some known strategies include, for example, forming discharge paths to direct the collected charge away from the gate. Another known strategy for mitigating PID on the gates is to restrict hierarchical wiring so that it does not exceed a specified layer of metal associated with the pin terminal of the gate. According to yet another strategy, antenna diodes are added to the circuit and serve as a protection element for the gate. PID charge introduced from the trace or wire behaving as an antenna is released to the substrate as a forward current or a reverse leakage current of the added diode to suppress characteristic variations caused by the PID to the gate.

Figure 1:
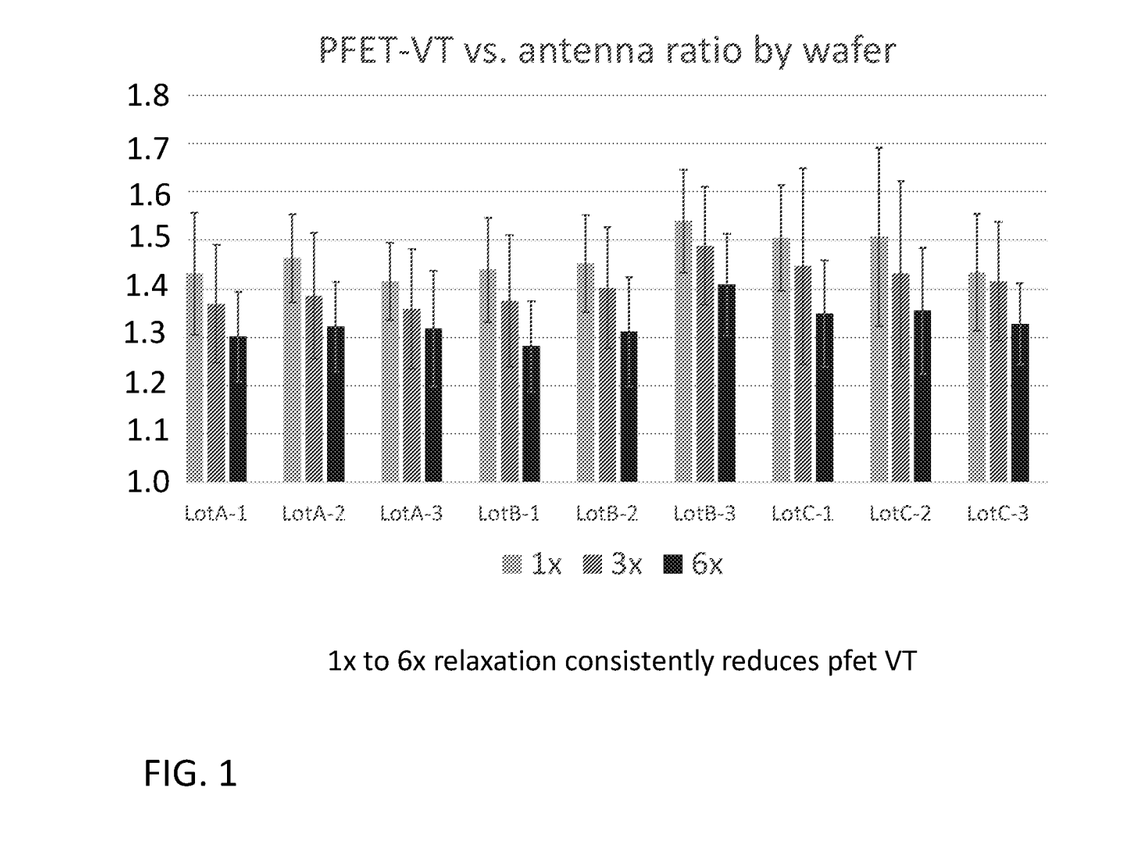
FIG. 1 depicts a chart illustrating an unexpected improvement in the voltage threshold across three lots of ICs after intentionally exposing gates to an increasing level of plasma induced damage (PID)

Contrary to conventional wisdom, experiments according to the teachings of the present disclosure have unexpectedly discovered that exposing gates to PID can enhance gate performance, and thus increase overall processor frequency (e.g., processor operating speed). FIG. 1, for example, depicts a chart illustrating an unexpected improvement (e.g., reduction) in the voltage threshold (VT) (e.g., gate-to-source voltage threshold ($VGS_{th}$)) of PFETs and thus increasing gate switching speeds. In terms of PFET devices, for example, VGS is a negative value in 'normal' usage, so PFET devices operate faster as their threshold voltage increases. In some discussions, absolute value of the threshold voltage is used so that the threshold voltages of PFET and NFET devices can be more clearly described. Accordingly, the chart shown in FIG. 1 refers to the absolute value of the PFET VT, which decreases from 1×, to 3× to 6×. It should be appreciated, however, that the "real" threshold voltage of the PFET is actually increasing (becoming less negative). These measurements were confirmed across multiple chips and multiple lots of ICs after intentionally exposing the PFETs to an increasing level of PID. For purposes of explanation, let us consider a 'net' as being a combination of metal shapes connecting one or more RX diffusion areas on the wafer to one or more gate areas on the wafer. In this chart, the 1×, 3×, and 6× antenna ratios refer to the ratio of the metal area of a given metal layer of a given net with respect to the combination of the amount of gate area and the amount of RX diffusion area connected to the net. In one or more non-limiting embodiments, the antenna ratio can be optimized or adjusted by increasing the metal area for a given gate plus RX diffusion area. It should be appreciated, however, that the antenna ratio can be optimized or adjusted using other techniques as described herein. These unexpected results therefore support a novel technical concept that intentionally exposing gates to PID originating from antenna effect can enhance gate performance.

Various non-limiting embodiments utilize the novel concept described herein of intentionally exposing a gate included in an IC to PID to enhance gate performance. In one or more non-limiting embodiments, gate performance is improved by intentionally increasing a level of PID applied to a gate. The level of PID can be increased by intentionally increasing a metal area, reducing gate area, and/or changing process techniques to exacerbate antenna impacts and the antenna effect realized by the gate. Timing-aware design compensations can also be performed to ensure targeted microprocessor functionality is achieved in the presence of these changes.

Figure 2:
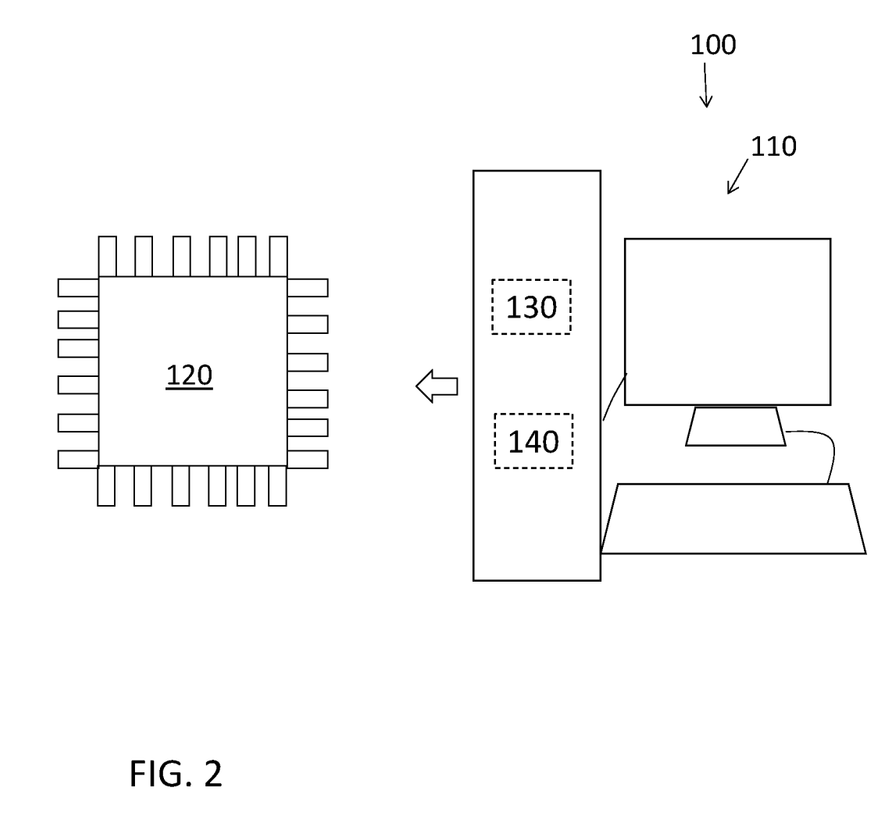
FIG. 2 is a block diagram of a system configured to fabricate an IC having increased processor frequency based on antenna optimization according to a non-limiting embodiment of the present disclosure.

With reference now to FIG. 2, a system 100 configured to fabricate an IC 120 having improved processor frequency based on antenna optimization according to a non-limiting embodiment of the present disclosure. The system 100 includes processing circuitry 110 used to generate the design that is ultimately fabricated into an IC 120. The processing circuitry 110 includes one or more processors 130 and memory 140 storing one or more software programs and code (collectively referred to as software).

The software can include, but is not limited to, computer readable program instructions for carrying out operations of the present invention, assembler instructions, instruction-set-architecture (ISA) instructions, traffic generator and simulator programs, workload traces, cache layout information, instruction and data addresses, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The memory 140 can also store computer readable program instructions, which may execute entirely on the user's computer, partly on the user's computer, as a stand-alone software package, partly on the user's computer and partly on a remote computer or entirely on the remote computer or server.

The memory 140 can also include software that establishes an IC simulator capable of defining, capturing, and/or manipulating design specifications of an IC in a hardware description language (HDL), such as VHDL (very high speed integrated circuit hardware description language, IEEE standard 1076) or Verilog® (IEEE standard 1364; "Verilog" is a registered trade mark of Cadence Design Systems, Inc.). The resulting HDL description typically characterizes the IC at a level of abstraction, such as a register transfer level (RTL), or a behavioral level.

A compiler is used to transform the HDL description into a "compiled model" of the IC. A simulator is then used to verify proper functional operation of the compiled model according to the design specification. Once the compiled model has been functionally verified, a synthesizer is used to map the compiled model to technology-specific logic gate structures, producing a logic level "netlist." Following further functional verification and/or timing verification, suitable positions of the logic gate structures of the netlist relative to one another are determined.

According to one or more non-limiting embodiments, the system 100 is capable of performing timing-aware design compensations to ensure target microprocessor functionality is achieved with respect to antenna optimization design strategies for improving processor frequency. For example, the memory 140 can store various signal path characteristics and/or gate characteristics that define respective gate threshold voltage and timing thresholds corresponding to the antennas, gates, and/or overall IC. Accordingly, the system 100 can execute timing validation runs, which involves using timing models to predict the operating speed of various components (e.g., gates, latches, transistors, etc.), and the associated time it takes for a signal to traverse a set of transistors/logic gates in between clocked logic elements (e.g., latches). The timing results obtained from the timing validation runs can be compared to the timing thresholds to ensure that a given antenna design layout aimed at reducing gate threshold voltages to increase processor frequency does not cause early mode violations.

The steps involved in the fabrication of the integrated circuit 120 are well-known and briefly described herein. Once the physical layout is finalized, based, in part, on increasing processor frequency in an integrated circuit (IC) based on antenna optimization according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 7

Figure 3:
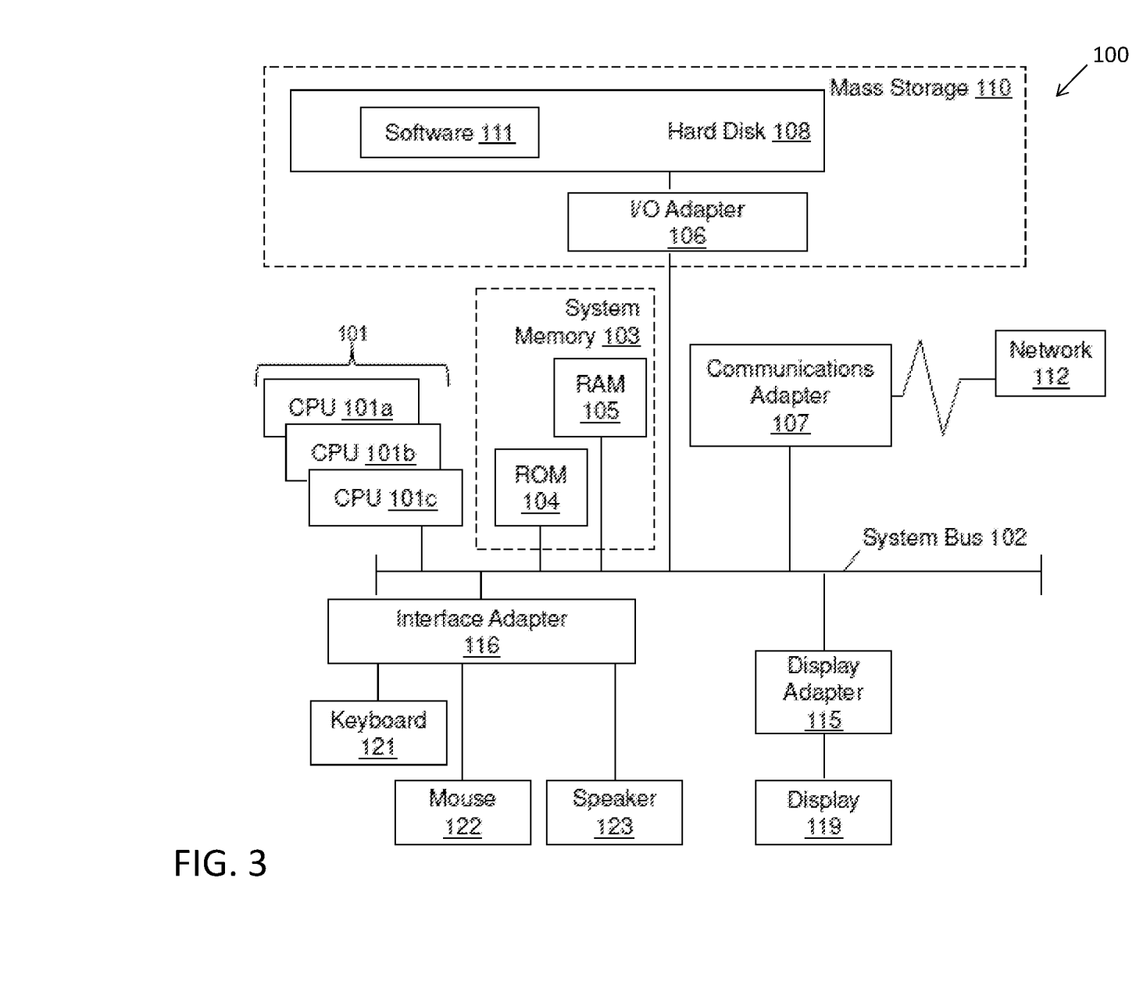
FIG. 3 depicts a block diagram of an example computer system for use in conjunction with one or more embodiments of the present disclosure.

FIG. 3 depicts a block diagram of an example computer system for use in conjunction with one or more embodiments of the present disclosure. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 3.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 3, the computer system 100 includes processing capability in the form of the processors 101, and storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 3 is not intended to indicate that the computer system 100 is to include all of the components shown in FIG. 3. Rather, the computer system 100 can include any appropriate fewer or additional components not illustrated in FIG. 3 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

As described herein, methods of improving processor frequency in an integrated circuit (IC) are based on various concepts that optimize antenna and/or gate design to exploit PID and improve gate performance. A first concept involves varying IC design characteristics of the antenna signal paths and/or gates to exploit PID performance-based improvements in the logic gates (e.g., reduced gate threshold voltage) included in the IC. This "PID design exploitation" concept includes: intentionally varying the metal area of a given antenna (e.g., length of the metal forming the antenna or amount of wafer area taken up by the conductive material of the antenna); intentionally varying the aspect ratio of a given antenna (e.g., a ratio of wire sizes in different dimensions); and/or intentionally varying the gate area (e.g., an occupied area of the wafer/chip) of a given gate connected to a respective antenna.

In one or more non-limiting embodiments, the PID design exploitation concept includes, for a given diffusion area, determining an antenna metal-to-gate metal ratio between a given antenna path and a corresponding gate. In some non-limiting embodiments, the diffusion area can also be varied to adjust the amount of charge (and PID) induced onto a gate. For example, the PID design exploitation concept can include predetermining a typical gate threshold voltage or an initial manufactured threshold voltage of the gates used in an IC, performing experiments to determine different levels of altered gate threshold voltages that occur in response to adjusting the antenna ratios. As described herein, the antenna ratios refer to the ratio of the metal area to the combined area of gate plus RX diffusion, i.e., "antenna ratio=metalArea/(gateArea+RXdiffusionArea). Accordingly, performing one or more of the concepts described can achieve a desired antenna ratio (i.e., metalArea/(gateArea+ RXdiffusionArea)) to achieve a targeted voltage threshold for a given gate when the gate and the antenna signal path are formed on the wafer/chip.

The "PID design exploitation" concept can also include designing the IC to employ one or more redundant signal paths associated with an antenna used to facilitate PID exploitation of a targeted gate. One or more of these redundant signal paths can be connected to a respective redundant gate and can be selected if the PID alteration of a targeted gate exceeds a damage threshold. According to a non-limiting embodiment, a VT tracking process can be performed to identify a damaged gate. For example, a gate will no longer operate if the VT alteration exceeds a damage threshold, thereby constituting a damaged gate. The VT tracking process can be implemented, for example, using a ring oscillator (e.g., an odd number of inverters linked together in a ring) with an activation gate. The ring oscillator can operate at a given frequency based on the VT of the devices in each gate). Referring to FIG. 1, for example, each stage of the ring oscillator would have the specified 1×, 3×, or 6× metal area for testing, and the ring oscillator frequency should increase with 1×→3×→6×, but will go to 0 as the gates exceed the damage threshold. Accordingly, when the PID alteration of a targeted gate exceeds the damage threshold, the redundant signal path can be selected to utilize a corresponding non-damaged redundant gate. In this manner, the IC can still be utilized should the PID exploitation damage the targeted gate.

Figure 4:
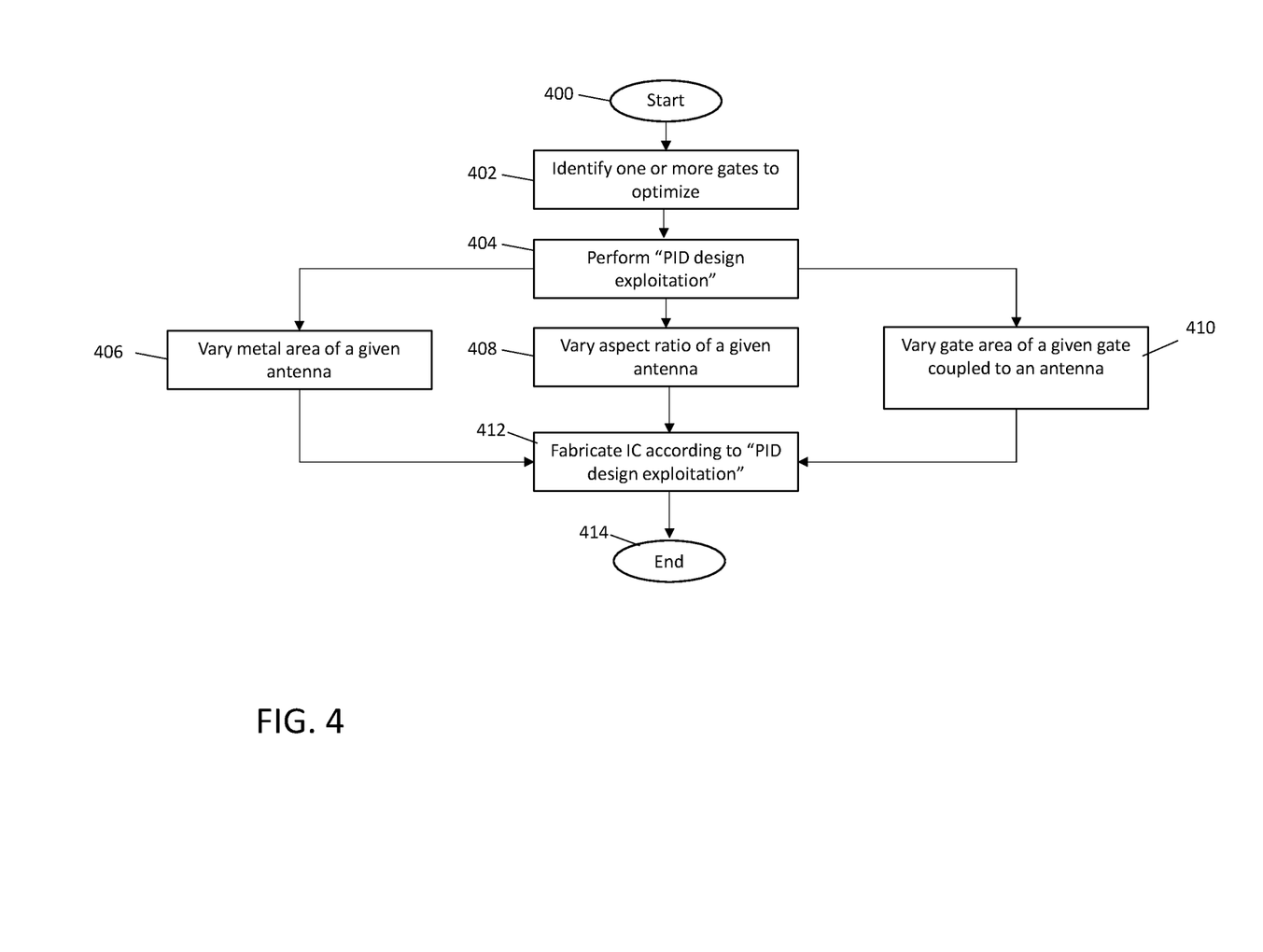
FIG. 4 is a flow diagram illustrating a method of increasing processor frequency in an integrated circuit (IC) based on antenna optimization according to one or more non-limiting embodiments of the present disclosure.

Referring now to FIG. 4, a method of performing PID design exploitation to improve processor frequency in an integrated circuit (IC) is illustrated according to one or more non-limiting embodiments of the present disclosure. The method begins at operation 400, and at operation 402 one or more targeted gates to be optimized are identified. At operation 404, one or more PID design exploitation procedures are performed to increase an amount of PID applied to the targeted gates. For example, the PID design exploitation procedures can include, but are not limited to, intentionally varying the metal area of a given antenna (e.g., length of the metal forming the antenna or amount of wafer area taken up by the conductive material of the antenna) at operation 406, intentionally varying the aspect ratio of a given antenna (e.g., a ratio of wire sizes in different dimensions) at operation 408, and intentionally varying the gate area (e.g., an occupied area of the chip) of a given gate connected to a respective antenna at operation 410. It should be appreciated that one or a combination of the PID design exploitation procedures described herein can be performed without departing from the scope of the invention. After completing the desired PID design exploitation procedure(s), an IC is fabricated at operation 412 based on the PID design exploitation procedure(s) that were performed, and the method ends at operation 414. All or a subset of the processing shown in FIG. 4 can be performed, for example, by one or both of the system 100 of FIG. 2 and computer system 100 of FIG. 3.

A second concept involves adjusting IC processing operations to exploit PID process-based improvements in the logic gates included in the IC. This "process-assisted PID exploitation" concept includes intentionally varying PID applied to a targeted gate by adjusting various IC processing operations associated with plasma etching and/or plasma deposition (e.g., plasma enhanced chemical vapor deposition (PECVD)). The processing operations can include, but are not limited to, adjusting plasma etch flux levels, adjusting plasma etch duration times, varying thicknesses of oxide materials located in non-etching regions, adjusting plasma deposition quantity levels, and/or adjusting plasma deposition duration times. By adjusting one or more of the processing operations, the charge accumulation on a given antenna can be increased, for example, thereby increasing the amount of PID applied to a corresponding gate. For example, increasing plasma etch flux levels and/or increasing plasma etching duration increases a level of charge stored on a given antenna. Accordingly, an increased level of PID is applied to the gate connected to the charged antenna, which in turn reduces the gate threshold voltage.

Figure 5:
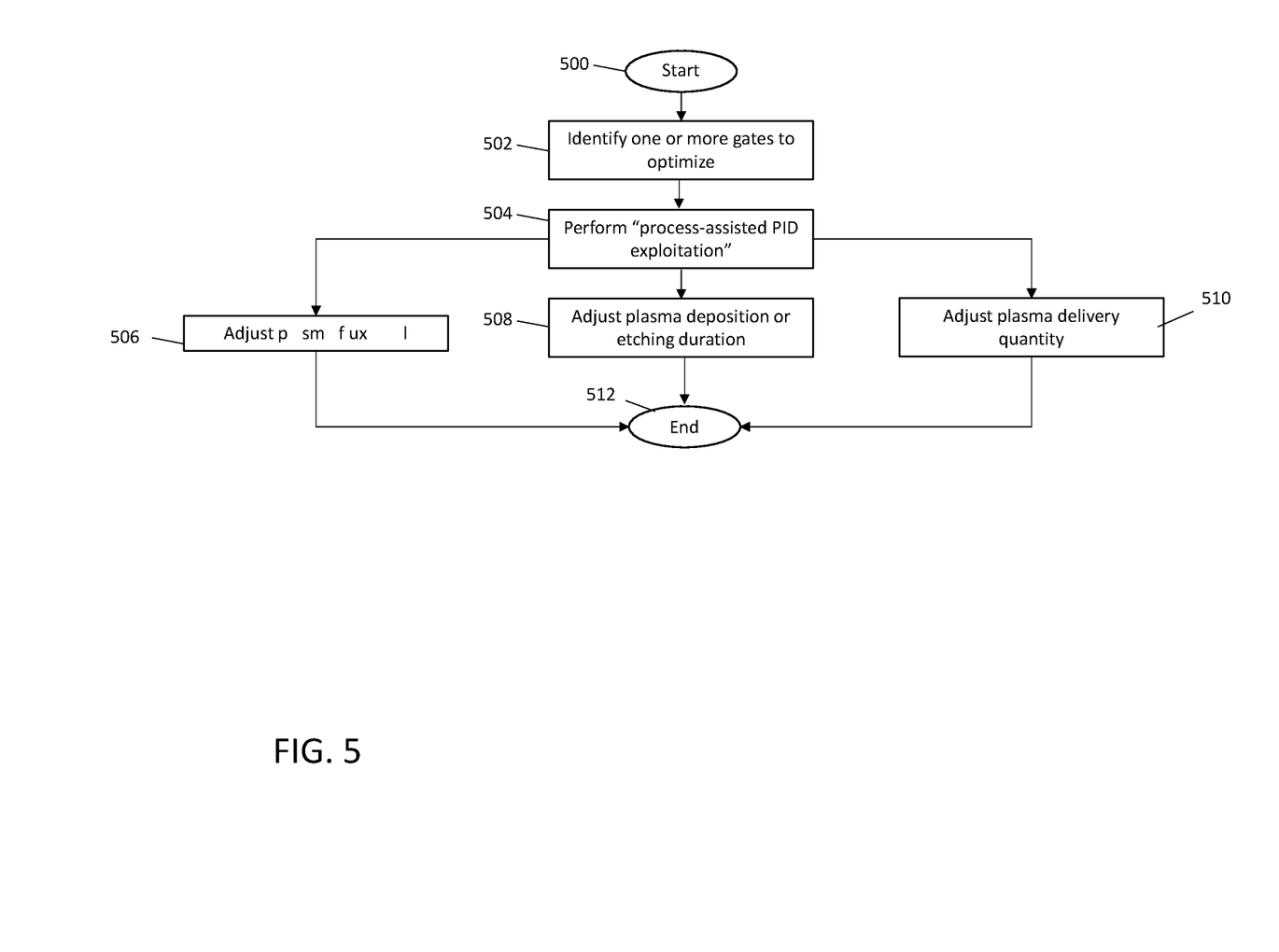
FIG. 5 is a flow diagram illustrating a method of increasing processor frequency in an integrated circuit (IC) based on antenna optimization according to one or more non-limiting embodiments of the present disclosure.

Referring now to FIG. 5, a method of performing process-assisted PID exploitation to improve processor frequency in an integrated circuit (IC) is illustrated according to one or more non-limiting embodiments of the present disclosure. The method begins at operation 500, and at operation 502 one or more targeted gates to be optimized are identified. At operation 504, one or more process-assisted PID exploitation procedures are performed to increase an amount of PID applied to the targeted gates. For example, the process-assisted PID exploitation procedures can include, but are not limited to, increasing a flux level of the plasma used to form an antenna path associated with a target gate at operation 506, increasing the duration at which plasma etch or plasma deposition is applied to the wafer to form an antenna path associated with a target gate at operation 508, and increasing a total amount of plasma delivered to a metal area when forming an antenna path associated with a target gate at operation 510. It should be appreciated that one or a combination of the process-assisted PID exploitation procedures described herein can be performed without departing from the scope of the invention. After the desired process-assisted PID exploitation procedure(s) are completed, the method ends at operation 512. All or a subset of the processing shown in FIG. 5 can be performed, for example, by one or both of the system 100 of FIG. 2 and computer system 100 of FIG. 3.

A third concept involves performing timing-aware design compensations to ensure microprocessor functionality in response to performing the first and/or second PID exploitation concepts described above. In one or more non-limiting embodiments, an IC fabrication system can store various signal path characteristics defining respective antenna and timing thresholds corresponding to the antennas included in an IC design. Accordingly, the system can execute timing validation runs to ensure that a given antenna design layout aimed at reducing gate threshold voltages and increasing gate speed does not cause early mode violations. An early mode violation can be viewed as a particular type of hold or setup violation, depending on if the data or clock signal is faster than expected. For example, the change in the threshold voltage of a gate may cause the data signal moving through that gate to speed up, arriving at a latch while it is still in a transparent pass-through mode, latching the signal into the previous clock cycle rather than the intended clock cycle.

Figure 6:
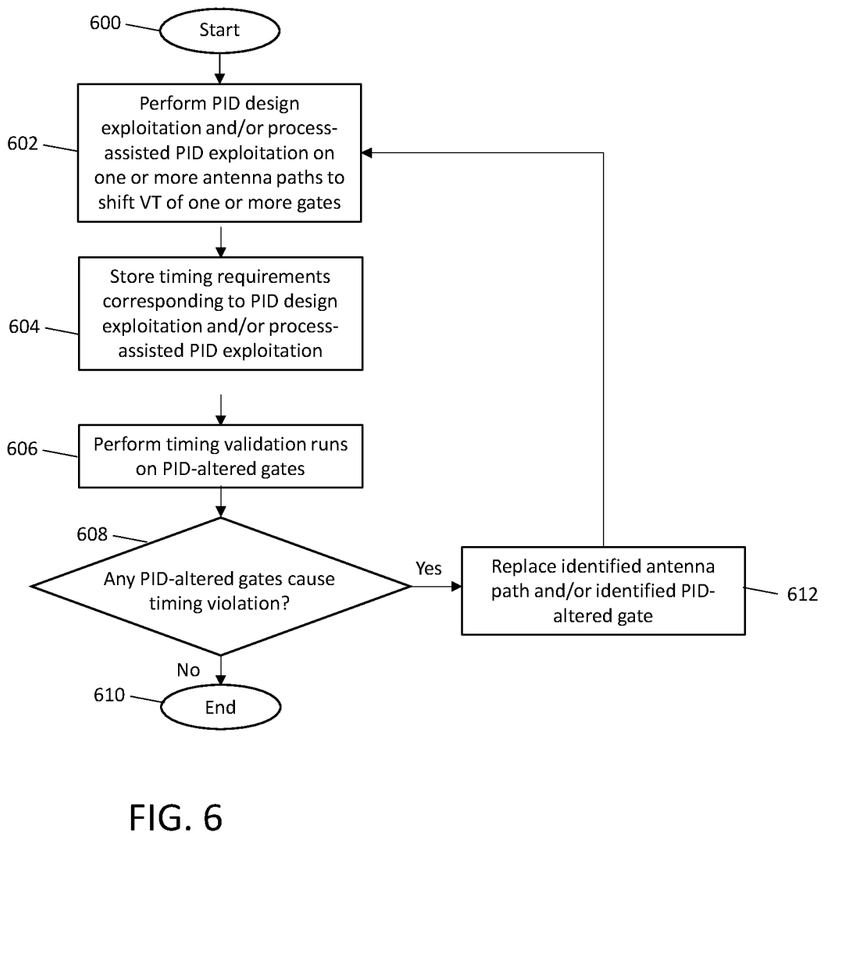
FIG. 6 is a flow diagram illustrating a method of increasing processor frequency in an integrated circuit (IC) based on antenna optimization according to one or more non-limiting embodiments of the present disclosure.

Referring now to FIG. 6, a method of performing timing-aware design compensations to ensure microprocessor functionality and improve processor frequency in an integrated circuit (IC) based on antenna optimization is illustrated according to one or more non-limiting embodiments of the present disclosure. The method begins at operation 600, and at operation 602 a PID design exploitation and/or a process-assisted PID exploitation is performed on one or more antenna paths to shift the VT of one or more gates. At operation 604, timing requirements corresponding to the PID design exploitation and/or the process-assisted PID exploitation are stored in memory. The timing requirements can include, for example, at least one timing threshold corresponding to one or both of a given antenna signal path and a given gate. For example, the timing requirements can be expressed as a model indicating a time duration at which it takes for a first component (e.g., a transistor) to charge or discharge a given wireload and pass a logic "1" value or a logic "0" value on to a second component (e.g., the next gate). The gate's threshold voltage refers to the amount of charging/discharging needed for the next gate in the path to start switching. At operation 606, timing validation runs are performed on the PID-altered gates. At operation 608, the results of the timing validation runs are analyzed to determine whether any of the PID-altered gates caused a timing violation. In one or more non-limiting embodiments, the timing violation can be identified by storing a timing threshold corresponding to one or both of a given antenna signal path and a given gate, comparing the timing results obtained from the timing validation runs to the timing threshold, and determining the timing violation in response to the timing results exceeding the timing threshold. When no timing violations are identified, the method ends at operation 610. All or a subset of the processing shown in FIG. 6 can be performed, for example, by one or both of the system 100 of FIG. 2 and computer system 100 of FIG. 3.

When, however, one or more PID-altered gates that cause a timing violation are identified, the method proceeds to operation 612 and one or more antennas (e.g., signal paths) and/or gates associated with an identified timing violation are replaced. The method then returns to operation 602 to again perform a PID design exploitation and/or a process-assisted PID exploitation on the replaced antenna paths and/or replaced gates to shift the respective gate threshold voltage. The timing validation runs and analysis are again performed at operations 604-608 until no further timing violations occur, and the method ends at operation 610.

Figure 7:
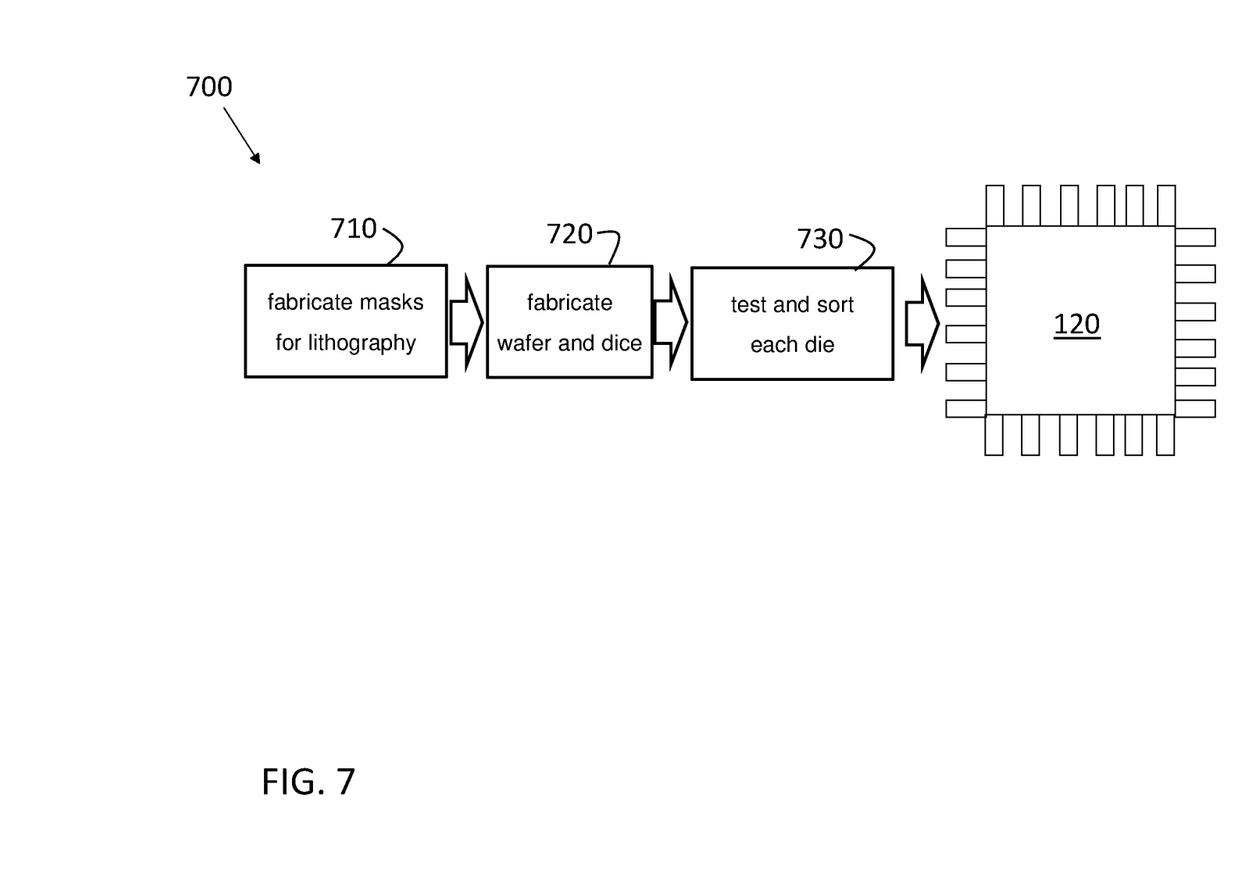
FIG. 7 is a process flow of a method of fabricating the integrated circuit (IC) according to one or more non-limiting embodiments of the present disclosure.

Turning to FIG. 7, a process flow 700 for fabricating the integrated circuit 120 is illustrated according to a non-limiting embodiment of the invention. Once the physical design data is obtained, based, in part, on forming improved processor frequency based on antenna optimization as described herein, the integrated circuit 120 can be fabricated according to known processes that are generally described with reference to FIG. 7. Generally, a wafer with multiple copies of the final design is fabricated and cut (i.e., diced) such that each die is one copy of the integrated circuit 120.

At block 710, the processes include fabricating masks for lithography (e.g., transistor masks, diode masks, and metallization masks) based on the finalized physical layout. At block 720, fabricating the wafer includes using the masks to perform photolithography and etching. Once the wafer is diced, testing and sorting each die is performed, at block 730, to filter out any faulty die before providing the fabricated integrated circuit 120.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system configured to fabricating an integrated circuit (IC) having an increased processor frequency, the system comprising:
a controller configured to perform receive design data of the IC, the design data identifying a targeted gate and an antenna signal path and a gate threshold voltage, wherein the controller is configured to perform a plasma induced damage (PID) design exploitation to increase an amount of PID applied to the targeted gate to provide a PID-altered gate,
wherein the PID-altered gate and the antenna signal path are formed on a wafer.

2. The system of claim 1, wherein the plasma induced damage (PID) design exploitation includes optimizing a ratio between a metal area corresponding to the antenna signal path and a gate area corresponding to the gate, the optimized ratio increases a level of plasma induced damage (PID) applied to the gate so as to alter the gate threshold voltage when forming the gate and the antenna signal path.

3. The system of claim 2, wherein the optimized ratio includes performing at least one of: varying the metal area of the antenna signal path, varying an aspect ratio of the antenna signal path, and varying the gate area of the gate.

4. The system of claim 3, wherein forming one or both of the gate and the antenna signal path according to the optimized ratio includes performing a plasma process that produces the plasma induced damage.

5. The system of claim 4, wherein performing the PID design exploitation further includes:
predetermining an initial manufactured gate threshold voltage of the gate;
determining different levels of altered gate threshold voltages that occur in response to adjusting one or more antenna ratios of the gate;
determining a target gate threshold voltage of the gate; and
performing one or more of varying the metal area of the antenna signal path, varying the aspect ratio of the antenna signal path, and varying the gate area of the gate to change the gate threshold voltage to the target gate threshold voltage.

6. The system of claim 5, wherein the gate threshold voltage has a first value and the target gate threshold voltage has a second voltage that is less than the first value of the gate threshold voltage.

7. The system of claim 6, wherein the antenna ratio of the gate is a ratio of the metal area with respect to a combination of the gate area and an RX diffusion of the gate area.

8. The system of claim 2, wherein altering the gate threshold voltage includes one of increasing or decreasing the gate threshold voltage to increase a switching speed of the gate.

9. The system of claim 8, wherein the plasma process includes a plasma etching process.

10. The system of claim 9, wherein adjusting the plasma process includes one or more of increasing plasma etch flux levels, increasing plasma etch duration times, and varying thicknesses of oxide materials located in non-etching regions.

11. The system of claim 8, wherein the plasma process includes a plasma deposition process.

12. The system of claim 11, wherein adjusting the plasma process includes one or more of increasing plasma deposition quantity levels and increasing plasma deposition duration times.

13. The system of claim 1, wherein the controller stores at least one timing threshold corresponding to one or both of the antenna signal path and gate, performs a timing validation run on the gate having the altered gate voltage threshold, and determines a timing violation of the gate having the altered gate voltage threshold based on the timing validation run.

14. The system of claim 13, wherein the PID-altered gate is to remove the timing violation.

15. The system of claim 14, wherein the controller determines the timing violation by comparing a timing result obtained from the timing validation run to the at least one timing threshold, and determining the timing violation in response to the at least one timing result exceeding the at least one timing threshold.

\* \* \* \* \*